US012240525B2

(12) United States Patent
Kale et al.

(10) Patent No.: US 12,240,525 B2
(45) Date of Patent: Mar. 4, 2025

(54) MODULAR AIR TANK CROSS MEMBER

(71) Applicant: Metalsa India Pvt. Ltd., New Delhi (IN)

(72) Inventors: Ganesh Gulab Kale, Pune (IN); Jaideep Pradeep Gurav, Pune (IN); Kaustubha Vishweshwar Bhinge, Pune (IN); Raviraj Dattatray Hase, Pune (IN); Erik Ostergaard, Roanoke, VA (US); Adolfo Suarez Maxwell, Roanoke, VA (US)

(73) Assignee: METALSA INDIA PVT LTD., New Delhi (IN)

( * ) Notice: Subject to any disclaimer, the term of this patent is extended or adjusted under 35 U.S.C. 154(b) by 0 days.

(21) Appl. No.: 18/566,017

(22) PCT Filed: Jun. 20, 2022

(86) PCT No.: PCT/IN2022/050561
§ 371 (c)(1),
(2) Date: Nov. 30, 2023

(87) PCT Pub. No.: WO2022/269629
PCT Pub. Date: Dec. 29, 2022

(65) Prior Publication Data
US 2024/0359745 A1    Oct. 31, 2024

(30) Foreign Application Priority Data
Jun. 21, 2021    (IN) .............................. 202111027773

(51) Int. Cl.
*B62D 21/16*    (2006.01)
*B62D 21/03*    (2006.01)
(52) U.S. Cl.
CPC ............. *B62D 21/16* (2013.01); *B62D 21/03* (2013.01)

(58) Field of Classification Search
CPC ................................ B62D 21/16; B62D 21/03
See application file for complete search history.

(56) References Cited

U.S. PATENT DOCUMENTS

| 5,788,198 A | 8/1998 | Sharpe |
| 7,503,586 B2 | 3/2009 | Ramsey |

(Continued)

FOREIGN PATENT DOCUMENTS

| DE | 102015015280 A1 * | 6/2016 | ............. B62D 21/02 |
| EP | 3378739 B1 | 9/2019 | |

(Continued)

OTHER PUBLICATIONS

International Search Report of PCT/IN2022/050561, dated Sep. 27, 2022.

*Primary Examiner* — Paul N Dickson
*Assistant Examiner* — Shams Dhanani
(74) *Attorney, Agent, or Firm* — Troutman Pepper Locke LLP

(57) ABSTRACT

The present invention provides for an improved air tank cross member deployable in a vehicle chassis. The ATCM comprises one or more structural elements comprising a tube forming an enclosure for holding a compressed fluid and having mounting extensions on an outer surface of the tube. The structural elements comprise two or more brackets connected to the mounting extensions of the tube and a pair of end caps disposed at opposite ends of the tube for forming the enclosure. The brackets are attached to the end caps by a fastening means to form a unified mounting geometry. The arrangement and construction of the structural elements of the ATCM provide for space-saving and weight-saving and increases stiffness value of one or more stiffness parameters of the vehicle chassis.

28 Claims, 12 Drawing Sheets

(56) References Cited

U.S. PATENT DOCUMENTS

| | | | | |
|---|---|---|---|---|
| 2005/0062251 A1* | 3/2005 | Ramsey | ............... | B60G 21/051 |
| | | | | 280/124.153 |
| 2007/0216147 A1* | 9/2007 | Ramsey | ................ | B60G 9/003 |
| | | | | 280/781 |
| 2010/0327573 A1* | 12/2010 | Burns | .................... | B62D 21/16 |
| | | | | 280/830 |
| 2023/0052999 A1* | 2/2023 | Ramegowda | .......... | B62D 21/12 |
| 2023/0204161 A1* | 6/2023 | Takaro | ................. | F17C 13/084 |
| | | | | 211/85.18 |

FOREIGN PATENT DOCUMENTS

| | | | | | |
|---|---|---|---|---|---|
| EP | | 3870497 B1 * | 8/2022 | ............. | B62D 21/02 |
| WO | WO-2021151657 A1 * | | 8/2021 | ............. | B60G 11/30 |

\* cited by examiner

| Stiffness | Conventional Cross Member | First ATCM | Second ATCM | Third ATCM | Fourth ATCM |
|---|---|---|---|---|---|
| Torsional | X | 4X | 4X | 8X | 1.6X |
| Bending | X | X | X | X | |
| Lateral | X | 1.12X | 1.6X | 1.2X | |

FIG. 9

MODULAR AIR TANK CROSS MEMBER

This application is a national stage application under 35 U.S.C. § 371 of PCT Application No. PCT/IN2022/050561, filed Jun. 20, 2022, which claims the priority benefit of Indian Patent Application number 202111027773, filed Jun. 21, 2021, each of which is incorporated by reference herein in its entirety.

FIELD OF THE INVENTION

The present invention relates generally to the field of cross members deployable on vehicle chassis, and more particularly, the present invention relates to an improved modular air tank cross member for deployment on a vehicle chassis.

BACKGROUND OF THE INVENTION

One of the most important structural members of any Heavy Commercial Vehicle (HCV) is a chassis frame. Chassis frame is kind of a rectangular frame resembling a ladder that comprises of two side members, also called side rails, joined by a series of cross members. The cross members are deployed to assist the side rails to overcome lateral, bending and torsional loads. Main function of the chassis frame is to safely carry maximum load under all designed operating conditions. As such, the vehicle chassis should be rigid enough to withstand impact of various forces such as bending forces, twisting forces, vibrations and other forces.

Despite existing solutions, there is still a need to develop cross members for vehicle chassis that reduces vehicle weight and saves space while meeting structural rigidity requirements. Vehicle manufacturers are constantly trying to minimize vehicle weight that is particularly important for heavy duty vehicles such as trucks. Trucks with minimized vehicle weight may result in a higher load capacity and a minimized weight may also result in lower fuel consumption and thus leading to more economical operation with less environmental impact. Typically, a vehicle requires many different components, and each component increases the weight of the vehicle while unnecessarily occupying valuable space.

In light of the above-mentioned drawbacks, there is a need for an improved modular air tank cross member which results in adequate stiffness of vehicle chassis. There is a need for an improved modular air tank assembly for an improved load transfer and handling capacity.

SUMMARY OF THE INVENTION

In various embodiments of the present invention, an improved air tank cross member (ATCM) (102,200,600,800) deployable in a vehicle chassis is provided. The ATCM (102, 200,600,800) comprises one or more structural elements comprising a tube (106, 206,602,806) forming an enclosure for holding a compressed fluid and having mounting extensions on an outer surface of the tube (106, 206,602,806) for mounting auxiliary components. The structural elements comprise two or more brackets (108, 208,604,808) connected to the mounting extensions of the tube (106, 206, 602,806) and a pair of end caps (110,210,608,810) disposed at opposite ends of the tube (106, 206,602,806) for forming the enclosure. The brackets (208) are attached to the end caps (110, 210,608,810) by a fastening means to form a unified mounting geometry. The arrangement and construction of the structural elements of the ATCM (102, 200,600, 800) provides for space-saving and weight-saving and increases stiffness value of one or more stiffness parameters of the vehicle chassis (100).

An improved air tank cross member (ATCM) (700) deployable in a vehicle chassis (100) is provided. The ATCM (700) comprises one or more structural elements. The structural elements comprise a tube (704) forming an enclosure for holding a compressed fluid and having mounting extensions on an outer surface of the tube (704) for mounting auxiliary components. Further, the structural elements comprises two or more integrated brackets (708) connected to the mounting extensions of the tube (704). The integrated brackets (708) include brackets and a plurality of ports (702) to cover two open ends of the tube (704). The arrangement and construction of the structural elements of the ATCM (700) provides for space-saving and weight-saving and increases stiffness value of one or more stiffness parameters of the vehicle chassis (100).

BRIEF DESCRIPTION OF THE ACCOMPANYING DRAWINGS

The present invention is described by way of embodiments illustrated in the accompanying drawings wherein.

Figure 3:
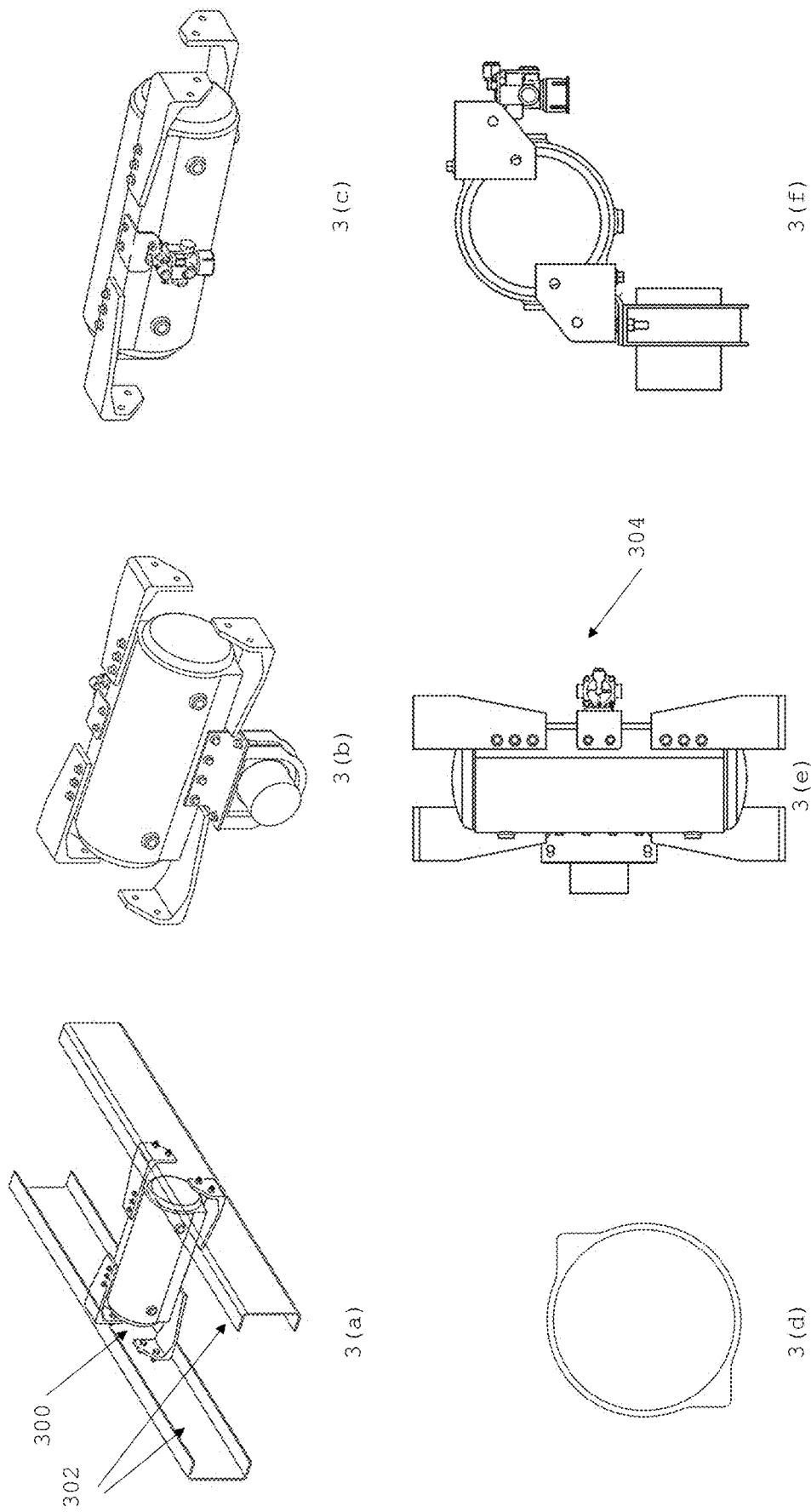
Figure 4:
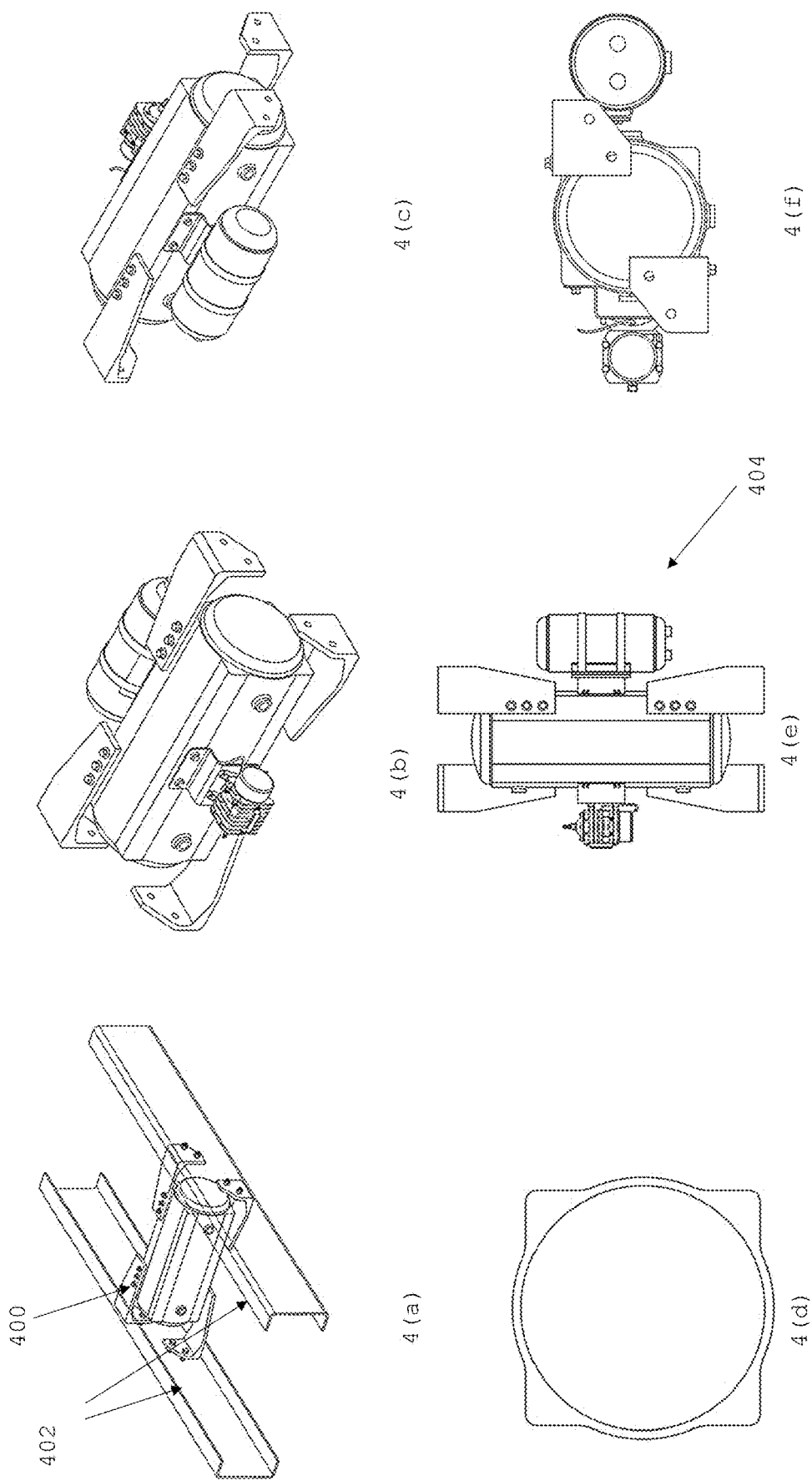
Figure 5:
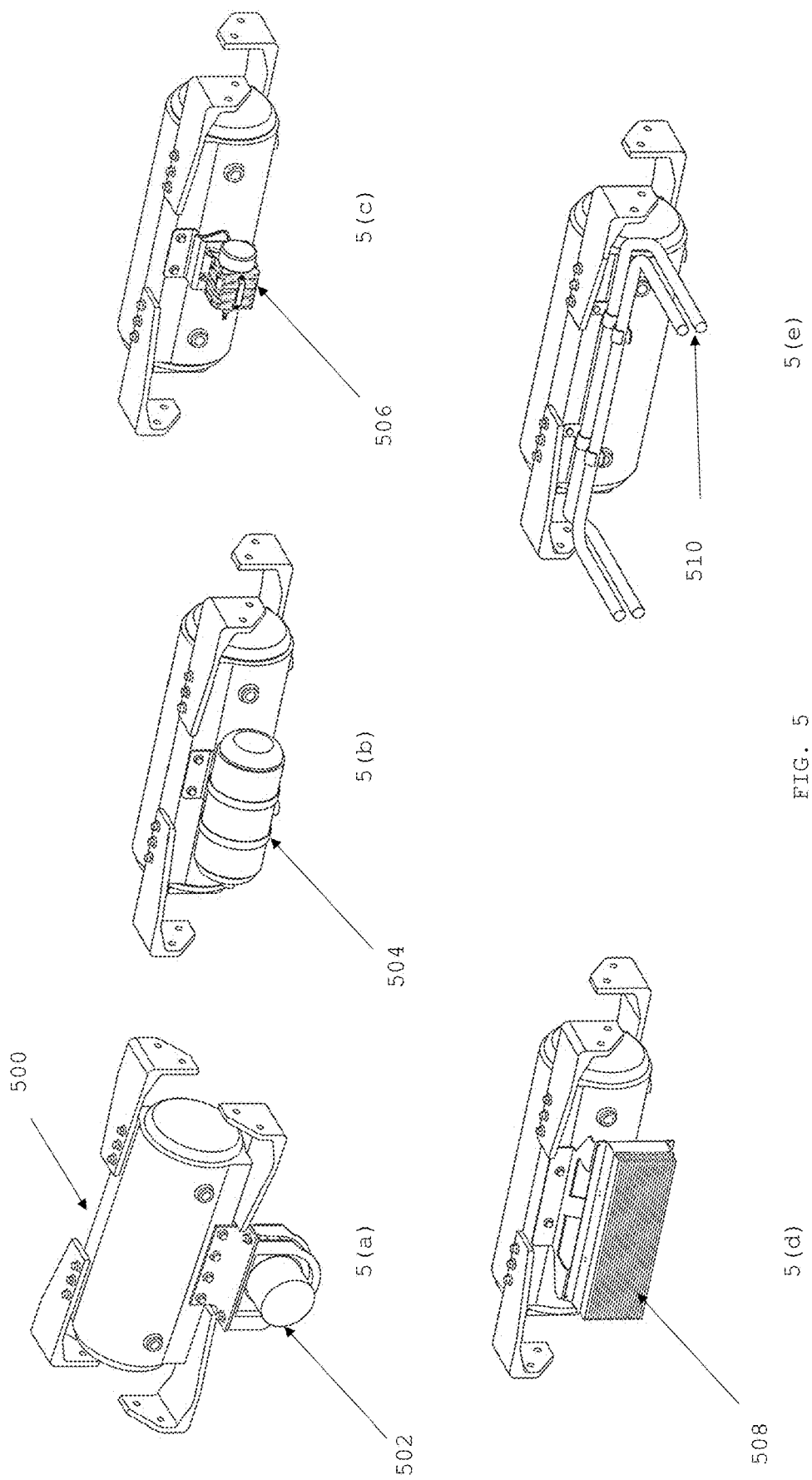
Figure 6:
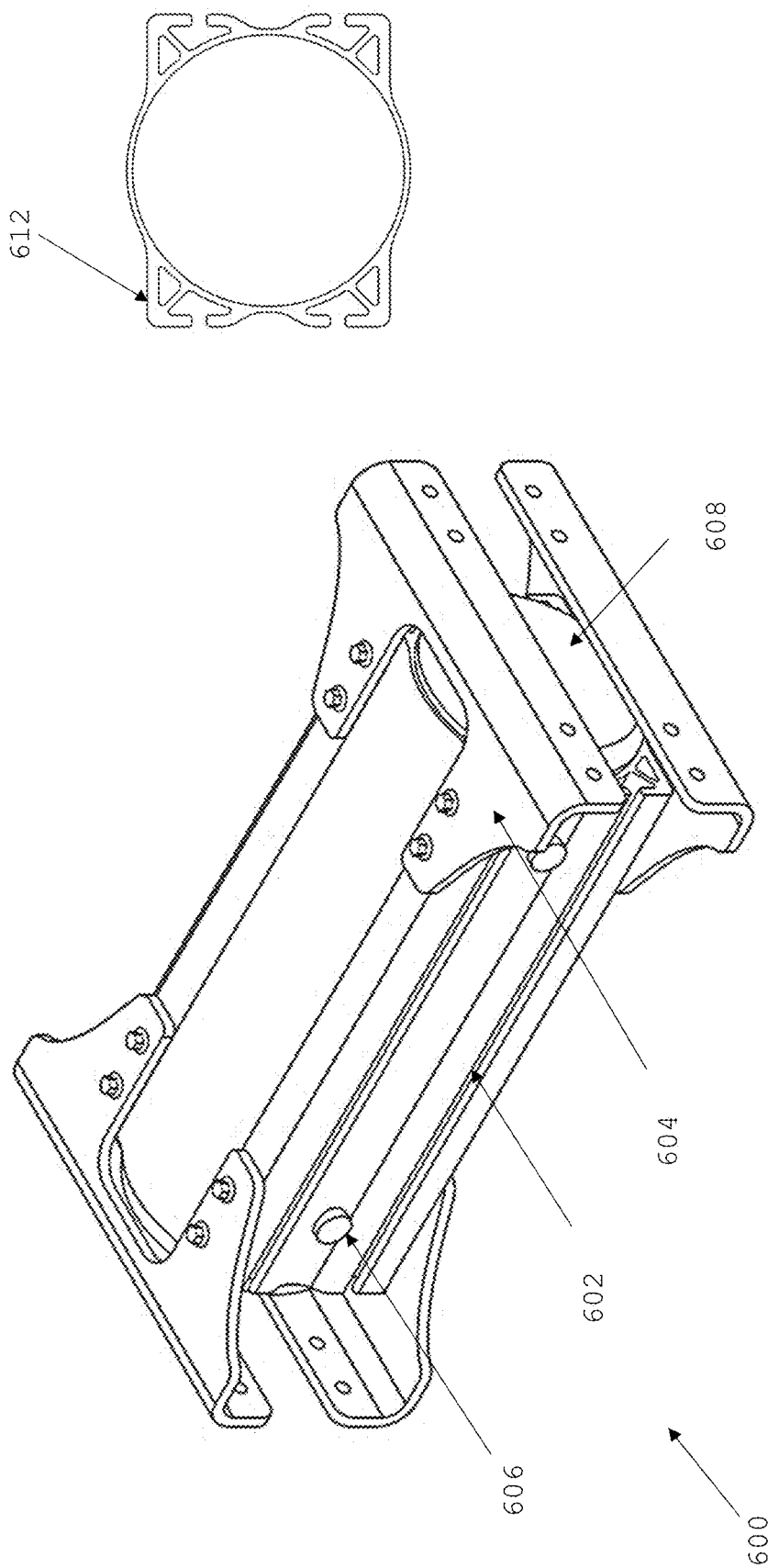
Figure 7:
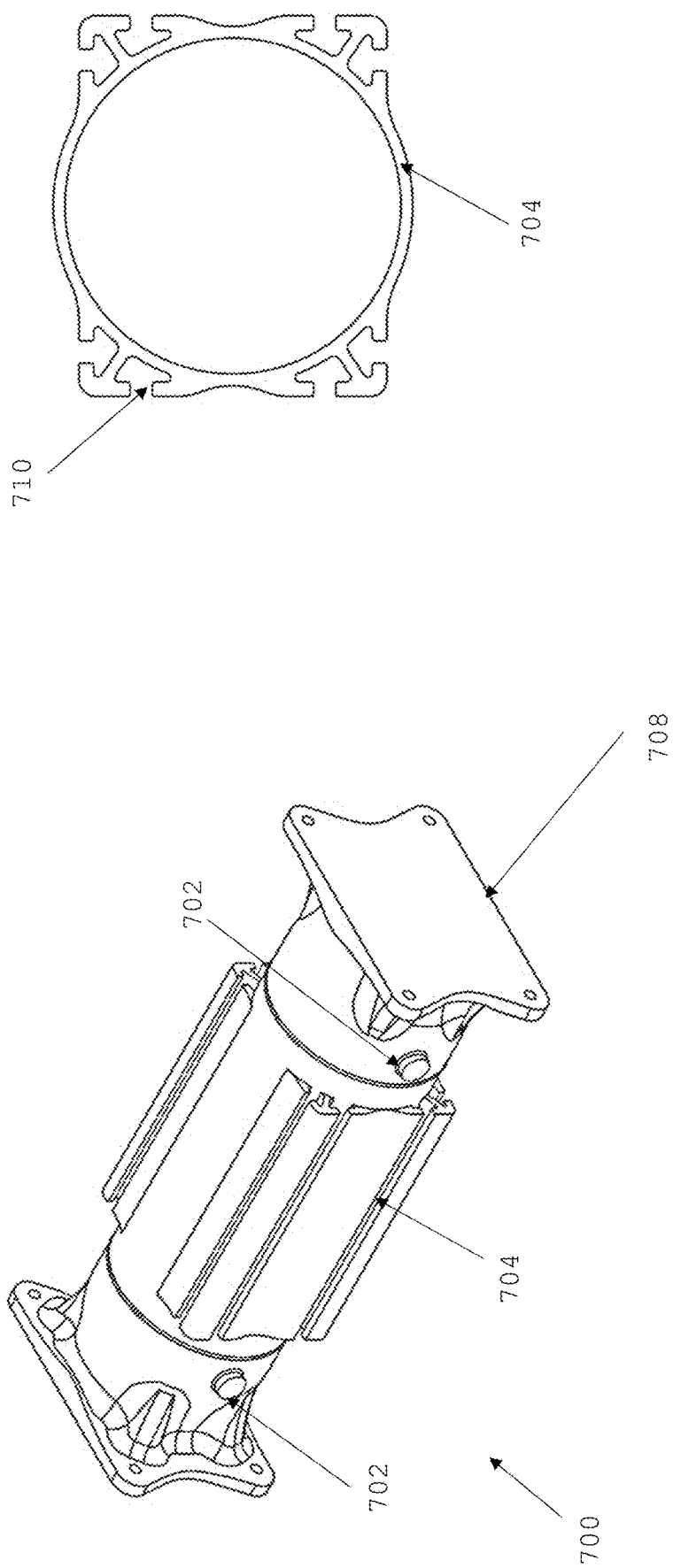
Figure 8:
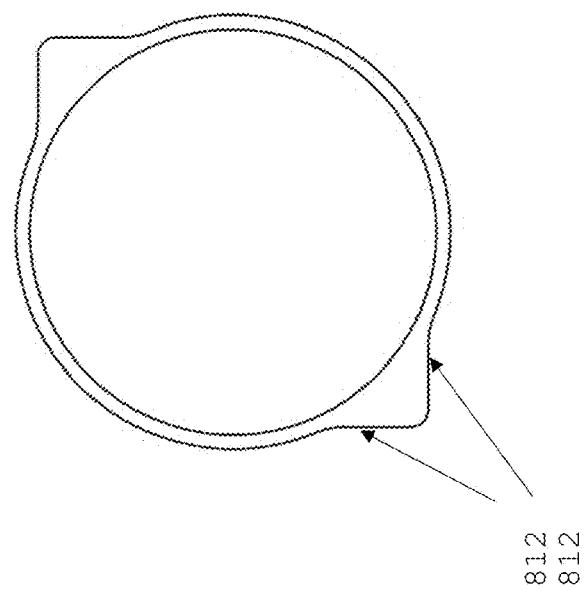
Figure 8:
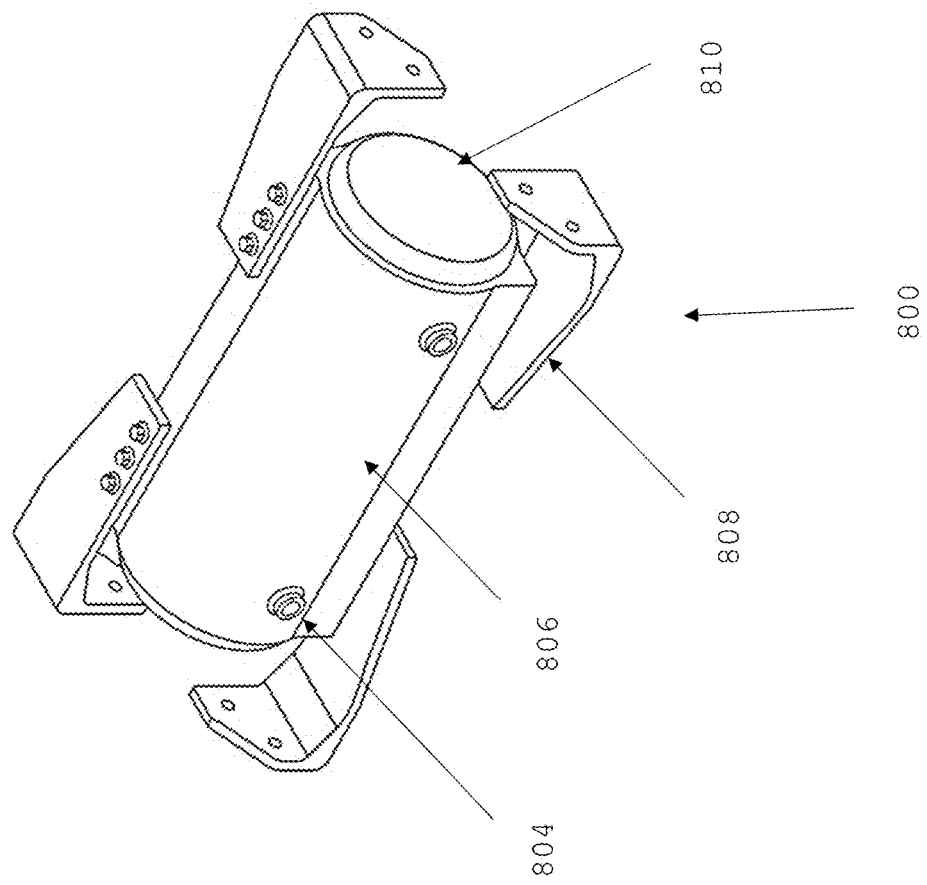
Figure 10:
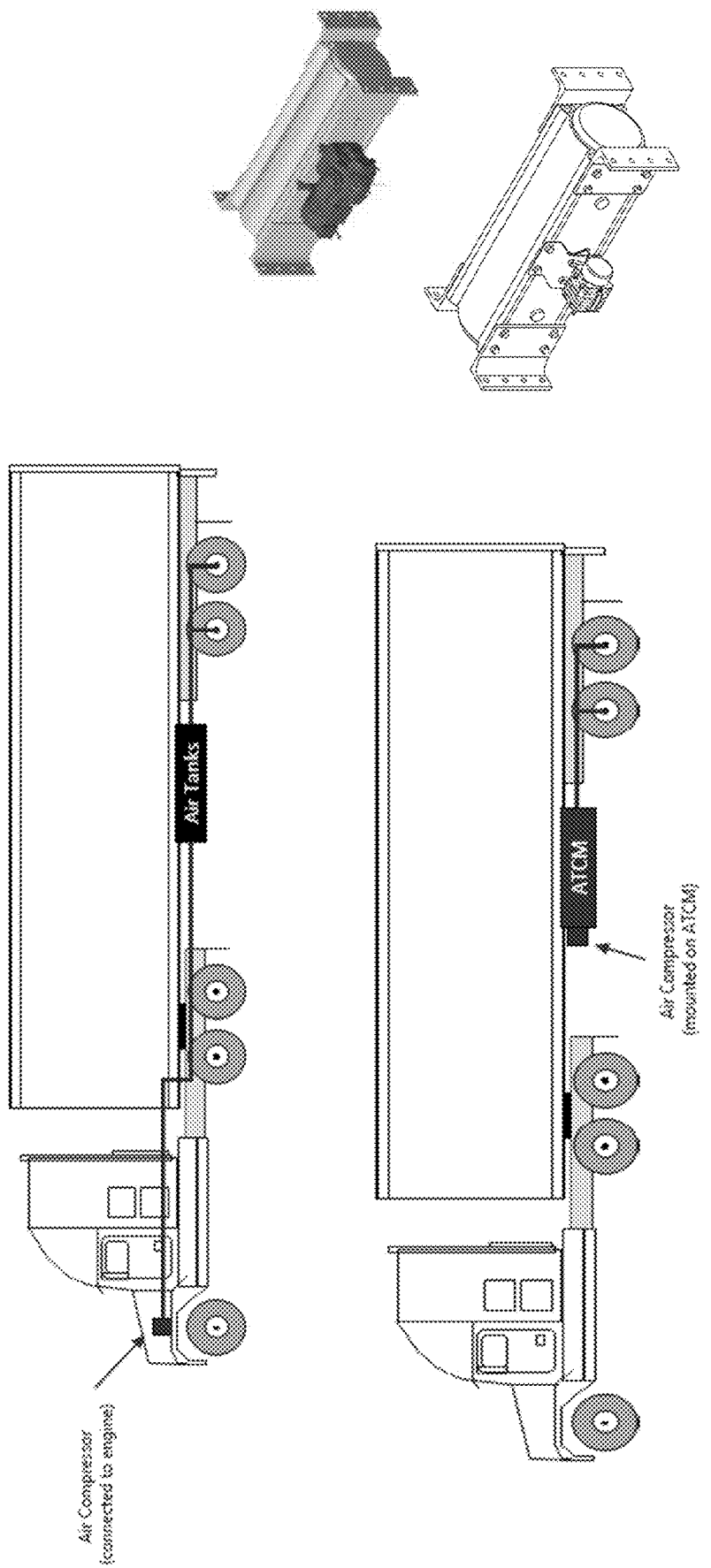
Figure 11:
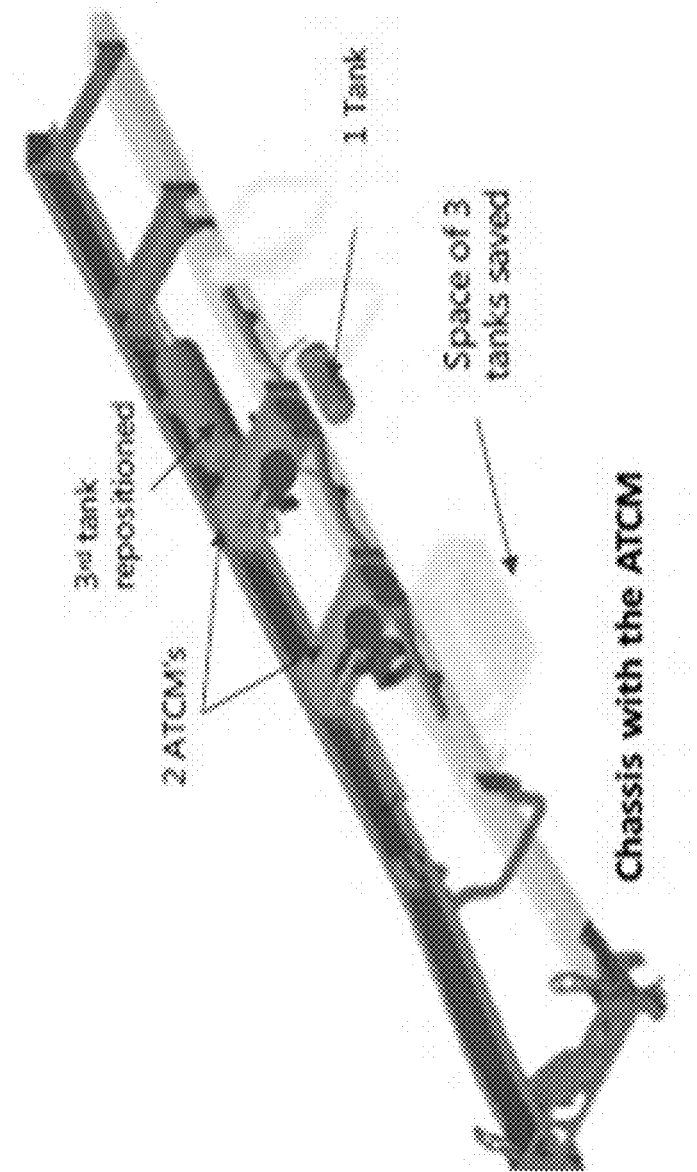
Figure 12:
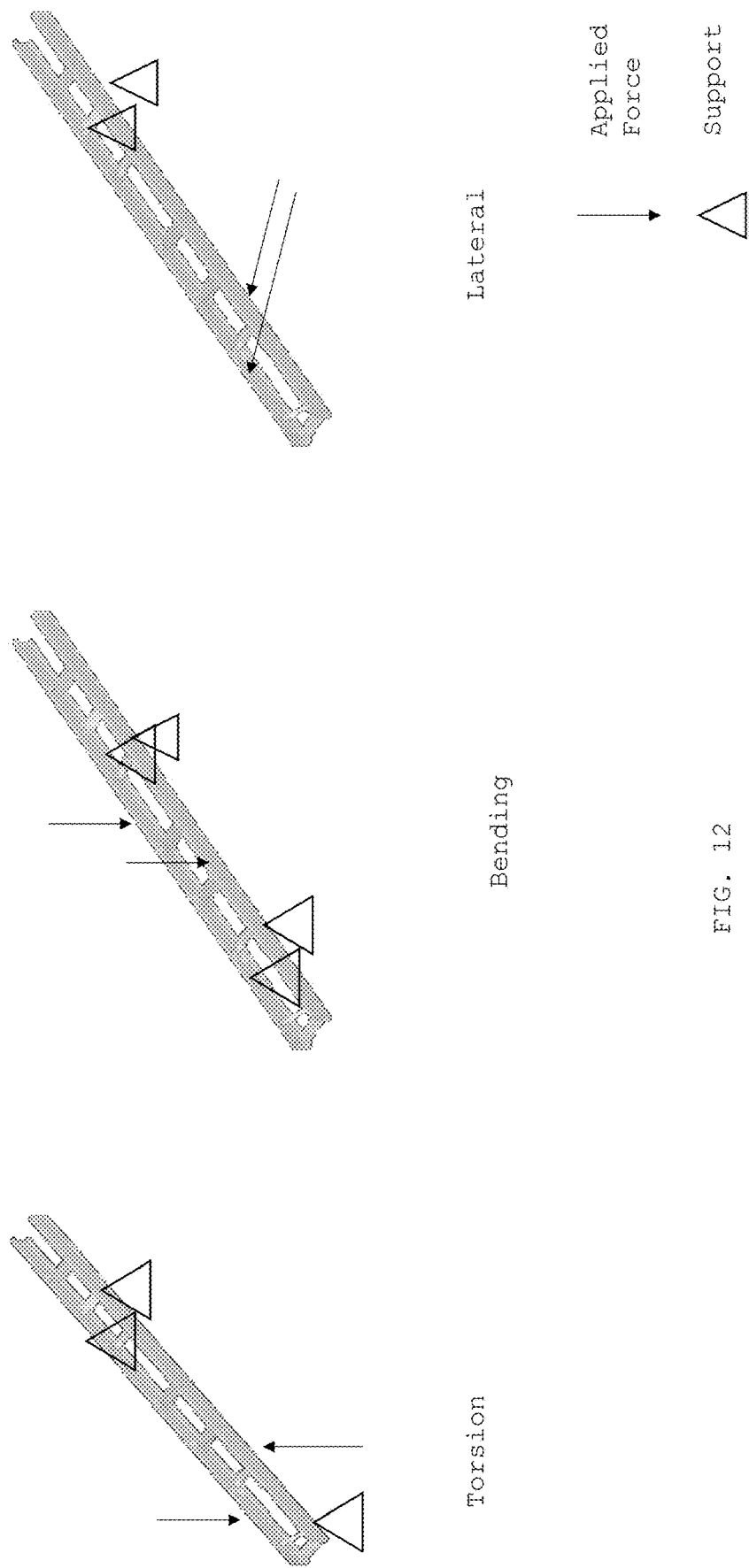

FIG. 3 (comprising FIGS. 3A-3F), 4 (comprising FIGS. 4A-4F), and 5 (comprising FIGS. 5A-5E) illustrate different mounting areas for mounting an auxiliary system across the ATCM, in accordance with an embodiment of the present invention FIG. 6 illustrates a second modular construction of the ATCM, in accordance with an embodiment of the present invention;

FIG. 7 illustrates a third modular construction of the ATCM, in accordance with an embodiment of the present invention;

FIG. 8 illustrates a fourth modular construction of the ATCM, in accordance with an embodiment of the present invention;

FIG. 9 illustrates difference in terms of torsional stiffness, bending stiffness and lateral stiffness of the first, second, third and fourth modular constructions of the ATCM after deployment on the vehicle chassis, in accordance with an embodiment of the present invention;

FIG. 10 illustrates mounting of an air compressor on the ATCM, in accordance with an embodiment of the present invention;

FIG. 11 illustrates replacement of air tanks by the ATCM depicting reduced space usage, in accordance with an embodiment of the present invention; and FIG. 12 illustrates torsional, bending and lateral stiffness demonstrated by the ATCM, in accordance with an embodiment of the present invention.

DETAILED DESCRIPTION OF THE INVENTION

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
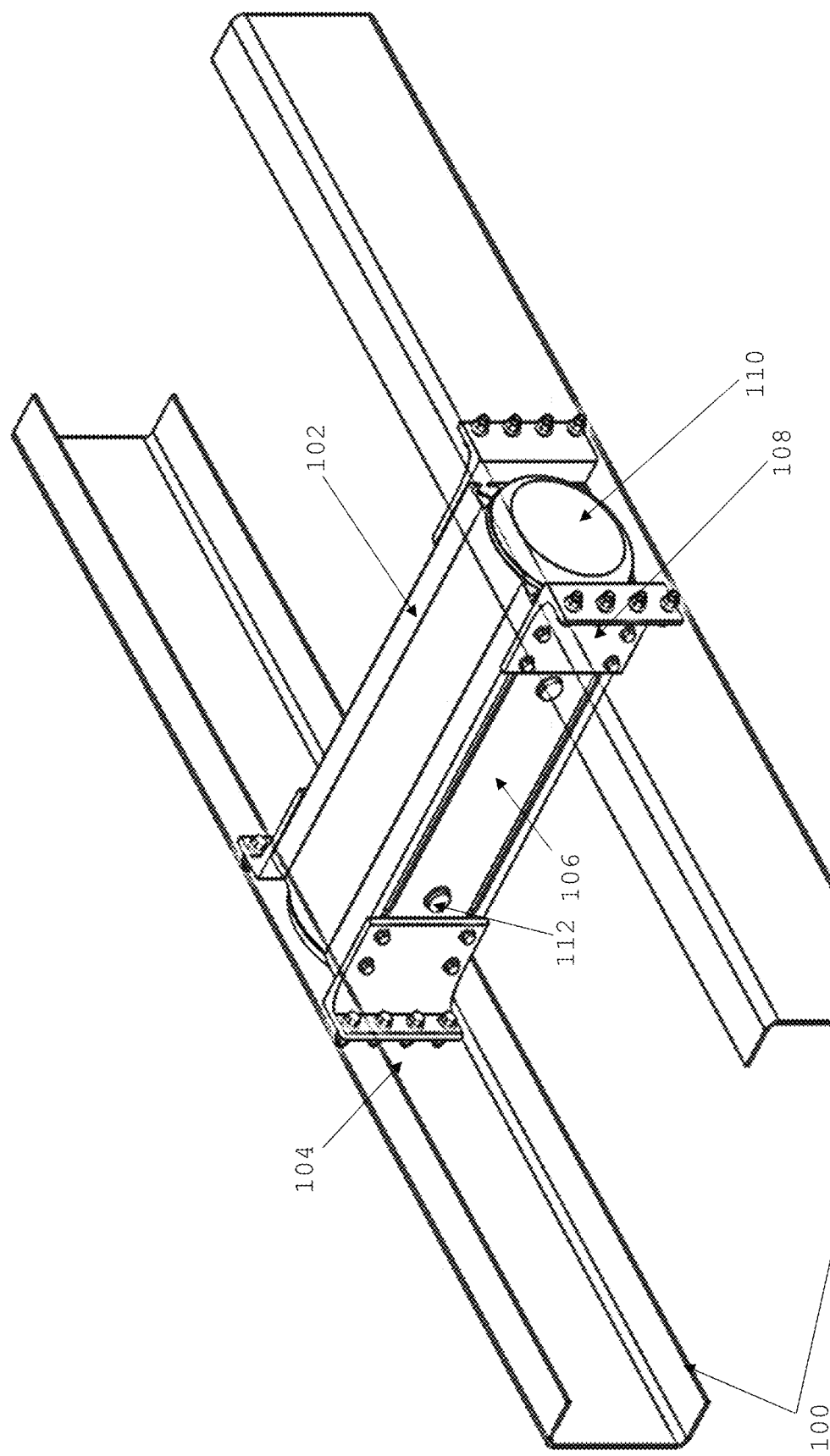
FIG. 1 is a diagram of a vehicle chassis with an Air Tank Cross Member (ATCM) deployed on the vehicle chassis, in accordance with an embodiment of the present invention.

FIG. 1 is a schematic diagram of a vehicle chassis (100) having an Air Tank Cross Member (ATCM) (102) in accordance with various embodiments of the present invention. In an embodiment of the present invention, the ATCM (102) is deployable as a connecting member between side rails (104) of the vehicle chassis (100). In another embodiment of the present invention, the ATCM (102) provides for an enclosure and serves as a reservoir for a compressed fluid. In an exemplary embodiment of the present invention, the compressed fluid may be an inflammable fluid. In another exemplary embodiment of the present invention, the compressed fluid may be a non-flammable fluid. In another embodiment of the present invention, the construction of the ATCM (102) provides a capability to mount auxiliary components on its outer periphery. In an embodiment of the present invention, the ATCM comprises one or more structural elements and the arrangement and construction of the structural elements of the ATCM provides for space-saving and weight-saving features of the ATCM and increases one or more stiffness parameters of the vehicle chassis. The one or more structural elements comprises a tube (106) forming an enclosure for holding a compressed fluid. The tube (106) has mounting extensions on an outer surface of the tube (106) for mounting auxiliary components.

In an exemplary embodiment of the present invention, the mounting extensions are in form of solid extensions. In another exemplary embodiment of the present invention, the mounting extensions are in form of hollow extensions. In yet another embodiment of the present invention, the mounting extensions are in the form of open extensions. The one or more structural components comprises two or more brackets (108) connected to the mounting extensions of the tube (106). Further, the one or more structural components comprises a pair of end caps (110) disposed at opposite ends of the tube (106) for forming the enclosure. A plurality of ports (112) is connected at the outer periphery of the tube (106) for allowing input and exit of the compressed fluid from the tube (106). The brackets (108) are attached to the end caps (110) by a fastening means to form a unified mounting geometry.

In various embodiments of the present, the structural elements of the ATCM (102) may be interconnected in multiple ways to achieve multiple modular constructions for the ATCM (102). Based on a type of vehicle chassis (100), a specific type of modular construction of the ATCM (102) may be adopted for deployment. FIGS. 2, 6, 7, and 8 (described herein below) illustrate different modular constructions of the ATCM (102), in accordance with various embodiments of the present invention.

Figure 2:
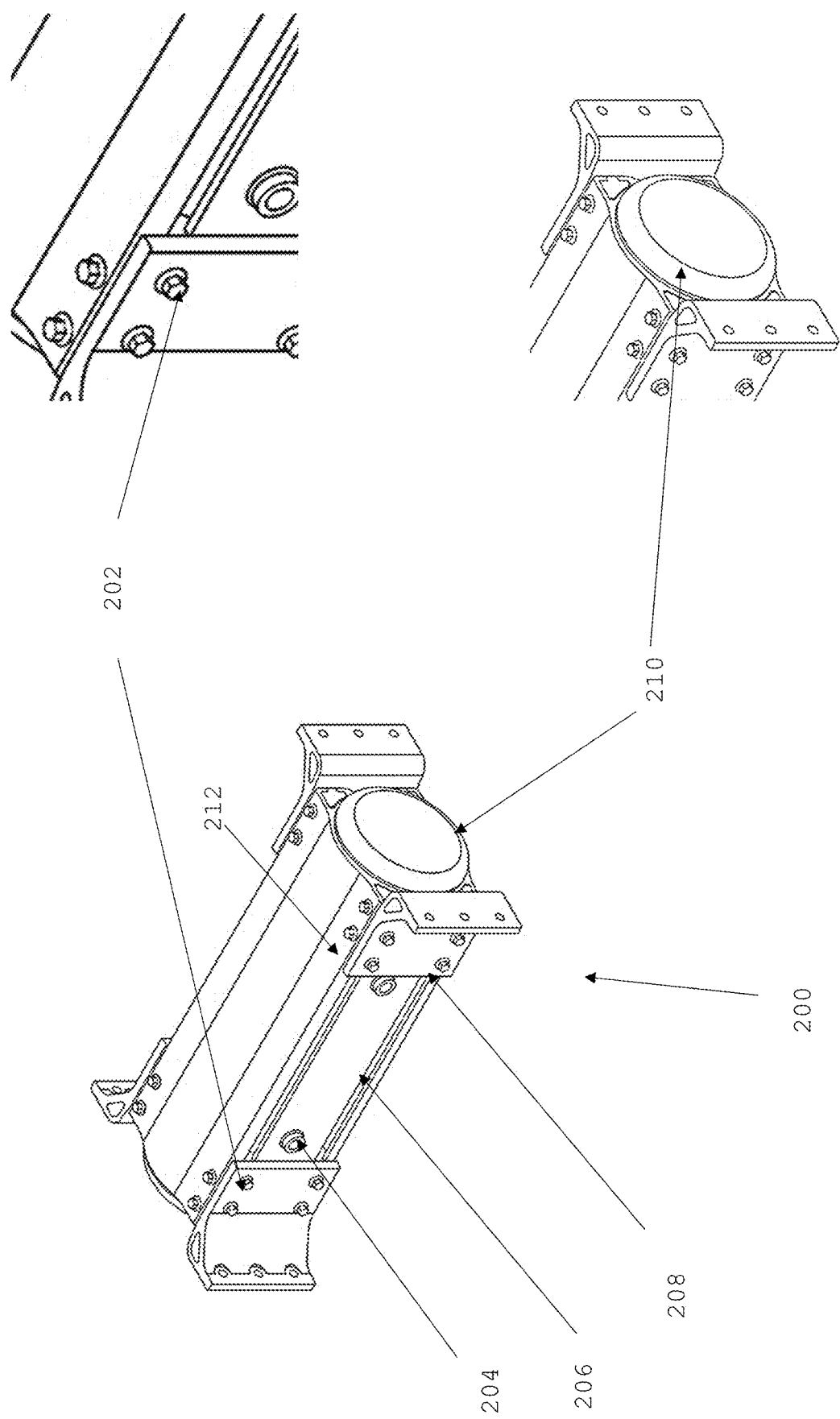
FIG. 2 illustrates a first modular construction of the ATCM, in accordance with an embodiment of the present invention.

FIG. 2 illustrates a schematic diagram of structural elements of a first modular construction of ATCM (200), in accordance with an embodiment of the present invention. The structural elements of the ATCM (200) comprises nuts (202), ports (204), tube (206), brackets (208) and end caps (210). In an embodiment of the present invention, the tube (206) is designed in a manner such that the tube (206) aids in minimizing weight of the vehicle chassis on which the ATCM (200) is mounted. In an exemplary embodiment of the present invention, the tube (206) of the ATCM (200) is a hollow circular section. In another exemplary embodiment of the present invention, the tube (206) is elliptical in shape. In yet another exemplary embodiment of the present invention, the tube (206) is square in shape. In another exemplary embodiment of the present invention, the tube (206) is rectangular in shape. In another embodiment of the present invention, the tube (206) has solid extensions (212) on its outer surface for mounting auxiliary components and for assembling the ATCM (200) with the auxiliary components.

In various embodiments of the present invention, the surface of the mounting extensions of the tube (206) is used for mounting and assembly of the auxiliary components on the ATCM (200). In an exemplary embodiment of the present invention, the tube (206) is of varied thickness and the thickness is determined based on structural requirements of the vehicle chassis (FIG. 1, 100). In an embodiment of the present invention, the tube (206) is made of steel or aluminum as per strength required for improved performance requirement of the vehicle chassis (FIG. 1, 100). In an embodiment of the present invention, the tube (206) is made from an extruded section. In another embodiment of the present invention, the tube (206) is joined to the other members of the ATCM (200) using welding.

In an embodiment of the present invention, the end caps (210) are disposed at two ends of the tube (206). The end caps (210) create an enclosed space for storing the compressed fluid (gas/liquid) within the ATCM (200). In an exemplary embodiment of the present invention, the end caps (210) of the ATCM (200) are a flat shaped closing structure for covering ends of the tube (206) of the ATCM (200). In another exemplary embodiment of the present invention, the end caps (210) of the ATCM (200) are a hemispherical shaped closing structure for covering the ends of the tube (206) of the ATCM (200) for creating enclosed space for storing the compressed fluid (gas/liquid) within the ATCM (200). In yet another exemplary embodiment of the present invention, the end caps (210) of the ATCM (200) are a tori spherical shaped closing structure for covering the ends of the tube (206) of the ATCM (200). In another exemplary embodiment of the present invention, the end caps (210) of the ATCM (200) are an ellipsoidal shaped closing structure for covering the ends of the tube (206) of the ATCM (200). In an embodiment of the present invention, the thickness of the end caps (210) is determined based on structural requirements of the vehicle chassis (FIG. 1, 100). In an exemplary embodiment of the present invention, the end caps (210) are welded to the tube (206). In another exemplary embodiment of the present invention, the end caps (210) are joined to the tube (206) using adhesives of suitable strength. In an embodiment of the present invention, the end caps (210) are made of steel or aluminum as per strength required for improved performance requirement of the vehicle chassis (FIG. 1, 100). In an embodiment of the present invention, the end caps (210) are manufactured using appropriate forming technique such as spinning, stamping etc.

In an embodiment of the present invention, the brackets (208) of the ATCM (200) are connected to the solid extensions of the tube (206) that attaches to the vehicle chassis frame as illustrated in FIG. 2. In an embodiment of the present invention, the ATCM (200) comprises a mounting joinery comprising the bracket (208) on the outer surface of the tube (206). The mounting joinery comprises a combination of the brackets (208) and a helicoil insert in a threaded hole of the solid extensions (212) on the outer surface of the tube (206) and the helicoil insert attaches the tube (206) to the bracket (208) via a bolt.

In an embodiment of the present invention, the mounting joinery may be either bolted, screwed or riveted to the tube (206) at the outer surface of the tube (206). In another embodiment of the present invention, the brackets (208) are attached to the end caps (210) by a fastening means to form a unified mounting geometry. In an exemplary embodiment of the present invention, the fastening means include nuts. The tube (206) may be welded to the mounting joinery with the end caps (210). In an exemplary embodiment of the present invention, the mounting joinery may be made of steel or aluminum as per strength required for improved performance requirement of the vehicle chassis (FIG. 1, 100). In another exemplary embodiment of the present invention, the mounting joinery is manufactured using appropriate forming technique such as extrusion, forming, machining, casting, forging etc.

In an embodiment of the present invention, the ports (204) of the ATCM (200) enable entry, release or complete emptying of a fluid in the enclosure of the ATCM (200). The ports (204) comprise an inlet, outlet and venting (drain) ports for carrying out the entry, release and emptying activity of the fluid in the enclosure. In an exemplary embodiment of the present invention, the ports (204) are made of steel or aluminum depending on the structural elements of the ATCM (200) to which the ports (204) are connected. In another embodiment of the present invention, the ports (204) are manufactured using extruding or machining.

In an embodiment of the present invention, operationally, the ATCM (200) comprising of the structural elements mentioned above increases stiffness value of one or more stiffness parameters of the vehicle chassis (100) after deployment. The stiffness value is defined as an extent to which an object resists deformation in response to an applied external force. The stiffness value of a vehicle is a measure of resistance offered by vehicle frame/chassis to deformation under external loading. Stiffness value affects steering control, vehicle stability, tyre wear, failure of peripheral components mounted on the vehicle chassis. Further, the stiffness value is a primary measure that is used to judge performance of the frame of a vehicle chassis. The ATCM (200) provides space-saving and weight-saving solutions having desired stiffness values, in accordance with an embodiment of the present invention.

FIG. 12 illustrates torsional, bending and lateral stiffness demonstrated by the ATCM (200) after deployment on the vehicle chassis (FIG. 1, 100), in accordance with an embodiment of the present invention. Also, dynamic behaviours like ride and handling, comfort of the vehicle is affected by the stiffness of the vehicle chassis. The stiffness of the vehicle chassis is defined by its bending stiffness, lateral stiffness, and torsional stiffness. The bending stiffness of the vehicle chassis plays a major role in isolating road vibrations to mounted components. The lateral stiffness plays a very important role in handling of a vehicle and cornering ability of a vehicle, and the torsional stiffness affects roll and lateral load transfer distribution. Further, limitation on improving stiffness depends on the effect on peripheral aggregates (over hanged components), ride and handling and comfort of a vehicle. Advantageously, the ATCM provides a range of stiffness improvement and depending on customer requirements, the different embodiments may be used for a particular application. Further, load transfer in the ATCM (200) is through the tube that eliminates the air tank functional failure due to structural load transfer that is a primary function of the cross member.

FIG. 3 illustrates different mounting areas for mounting an auxiliary system (304) across the ATCM (300), in accordance with an embodiment of the present invention. Examples of auxiliary system includes, but are not limited to, auxiliary components like brake valves, brackets etc. FIG. 3(a) illustrates mounting of the ATCM (300) across side rails (302) of a vehicle chassis. FIGS. 3(b), 3(c) and 3(d) illustrate isometric views of the ATCM (300). FIG. 3(e) illustrates a top view of the ATCM (300) with the auxiliary system (304) attached to the ATCM (300). FIG. 3(f) illustrates a side view of the ATCM (300) with the attached auxiliary system (304). FIG. 4 illustrates another variation of the ATCM (400) where FIG. 4(a) illustrates the ATCM (400) mounted across a side-rail (402). FIGS. 4(b) and 4(c) illustrate isometric views of the ATCM (400) with an auxiliary system (404) attached to the ATCM (400). FIG. 4(d) illustrates a tube section of the ATCM (400) with the auxiliary system (404) attached to the ATCM (400). FIG. 4(e) illustrates a top view of the ATCM (400) with the auxiliary system (404) attached to it and FIG. 4(f) illustrates a side view of the ATCM (400) with the auxiliary system (404) attached to it. FIG. 5 illustrates various auxiliary systems attached to the ATCM. FIG. 5(a) illustrates a proper shaft bracket (502) mounted across the ATCM (500). FIG. 5(b) illustrates a small tank (504) attached across the ATCM (500). FIG. 5(c) illustrates a compressor (506) attached across the ATCM (500). FIG. 5(d) illustrates a battery management system/controllers (506) attached across the ATCM (500). FIG. 5(e) illustrates pipes (508) attached across the ATCM (500). The above figures depict that the construction of the ATCM in accordance with various embodiments of the present invention allows ease of mounting auxiliary systems with reduced space requirement.

In an embodiment of the present invention, the pair of end caps (210) and a plurality of ports (204) are joined to the tube (206) by using welding. In another embodiment of the present invention, the pair of end caps (210) and a plurality of ports (204) are joined to the tube (206) using adhesive. In an embodiment of the present invention, the plurality of nuts (202) and the plurality of ports (204) are joined to the tube (206) by bolting. In another embodiment of the present invention, the plurality of nuts (202) and the plurality of ports (204) are joined to the tube (206) by riveting. In yet another embodiment of the present invention, the plurality of nuts (202) and the plurality of ports (204) are joined to the tube (206) by using fastening mechanisms. The tube (206) designed to hold the compressed fluid is welded to the pair of end caps (210) to ensure creation of a sealed chamber (enclosure) inside the ATCM (200). In another embodiment of the present invention, the plurality of ports (204) is welded to the outer periphery of the tube (206) to allow input and exit of the fluid from the enclosed member of the ATCM (200). In an exemplary embodiment of the present invention, the tube (206) is an extruded section that includes the mounting extensions. Further, the tube (206) allows for auxiliary components to be mounted onto the tube (206) that provides a modular function. In an embodiment of the present invention, one of the faces of the bracket (208) is bolted to the horizontal face of the tube (206) of the ATCM (200) using the nut (202). The other perpendicular face of the bracket (208) is used to bolt the ATCM (200) to side rails of the vehicle chassis (FIG. 1, 100).

In another embodiment of the present invention, a second modular construction of ATCM (600), as illustrated in FIG. 6, includes a tube (602), a pair of end caps (608), a plurality of brackets (604) and a plurality of ports (606). In an exemplary embodiment of the present invention, the end caps (608) and the ports (606) are joined to the tube (602) using welding. In another embodiment of the present invention, the end caps (608) and the ports (606) are joined to the tube (602) using adhesives. In an exemplary embodiment of the present invention, the ports (606) are joined to the tube (602) using bolting. In another exemplary embodiment of the present invention, the ports (606) are joined to the tube (602) using riveting. In yet another exemplary embodiment of the present invention, the ports (606) are joined to the tube (602) using fastening mechanisms. In an exemplary embodiment of the present invention, the second ATCM (600) is joined to the vehicle chassis (FIG. 1, 100) using bolting. In another exemplary embodiment of the present invention, the second ATCM (600) is joined to the vehicle chassis (FIG. 1, 100) using riveting. In yet another exemplary embodiment of the present invention, the second ATCM (600) is joined to the vehicle chassis (FIG. 1, 100) using a fastening mechanism. In an exemplary embodiment of the present invention, the tube (602) holding the fluid is welded to the end caps (608). The ports (606) are welded to the outer periphery of the tube (602) and are made from an extruded section to allow input and exit of the fluid. As illustrated in FIG. 6, a top and a bottom face of the tube (602) is a flat area that has hollow extensions (612) disposed on the outer surface provided for mounting auxiliary components. The brackets (604) are designed such that one perpendicular face of the bracket (604) is mounted on a top or a bottom face of the tube (602) and the other perpendicular face of the tube is used to bolt the ATCM (600) to side rails of the vehicle chassis (FIG. 1, 100).

FIG. 7 illustrates a third ATCM (700) that includes the tube (704) and an integrated bracket (708). In an exemplary embodiment of the present invention, the tube (704) is connected to the integrated bracket (708) using welding. In another exemplary embodiment of the present invention, the tube (704) is joined to the integrated bracket (708) using adhesives. In an exemplary embodiment of the present invention, two or more the tube (704) is connected to two or more integrated brackets (708) In an exemplary embodiment of the present invention, the third ATCM (700) is joined to the vehicle chassis (FIG. 1, 100) by using bolting. In another exemplary embodiment of the present invention, the third ATCM (700) is joined to the vehicle chassis (FIG. 1, 100) by using riveting. In yet another exemplary embodiment of the present invention, the third ATCM (700) is joined to the vehicle chassis (FIG. 1, 100) by using a fastening mechanism. In an embodiment of the present invention, the tube (704) is an extruded section and the auxiliary components are mounted onto a horizontal face or a vertical face of the tube (704) via open extensions (710) disposed on the outer surface of the tube (704). In an exemplary embodiment of the present invention, the tube (704) is welded to the integrated bracket (708) which includes brackets as well as a plurality of ports (702) and covers two open ends of the tube (704). The tube (704) welded to the integrated bracket (708) forms a cavity (enclosure) of the ATCM (700) for storing a fluid. In another embodiment of the present invention, the ATCM (700) comprises a mounting joinery that comprises the integrated bracket (708) and a nut insert in the open extensions (710) on the outer surface of the tube (704). The nut insert attaches the tube (704) to the integrated brackets (708) via a bolt. The tube (704) forms a direct connection of the third ATCM (700) to the vehicle chassis (FIG. 1, 100) which, advantageously, reduces number of parts required for the assembly of the third ATCM (700).

FIG. 8 illustrates a fourth ATCM (800) that includes end caps (810) and ports (804) which are joined to the tube (806) using welding, in accordance with an embodiment of the present invention. In an exemplary embodiment of the present invention, the end caps (810) and ports (804) are joined to the tube (806) using adhesives. In another exemplary embodiment of the present invention, the brackets (808) are joined to the tube (806) using bolting. In yet another exemplary embodiment of the present invention, the brackets (808) are joined to the tube (806) using riveting. In another exemplary embodiment of the present invention, the brackets (808) are joined to the tube (806) using a fastening mechanism. In an exemplary embodiment of the present invention, the fourth ATCM (800) is joined to the vehicle chassis (FIG. 1, 100) using bolting. In another exemplary embodiment of the present invention, the fourth ATCM (800) is joined to the vehicle chassis (FIG. 1, 100) using riveting. In yet another exemplary embodiment of the present invention, the fourth ATCM (800) is joined to the vehicle chassis (FIG. 1, 100) using fastening mechanisms. In an exemplary embodiment of the present invention, the tube (806) holding the fluid is welded to the end caps (810) and the ports (804) are welded to the outer periphery of the tube (806) to allow input and exit of the fluid from the tube (806) of the fourth ATCM (800). The tube (806) has two flat faces (812) that are perpendicular to each other, made on the outer periphery of the tube (806), such that the two flat faces (812) are diametrically opposite to each other. The two flat faces (812) provide the necessary area required to mount the brackets (808) as well as any auxiliary system that needs to be mounted on the fourth ATCM (800). The brackets (808) are designed in such a way that one perpendicular face is mounted on a bottom face of the tube (806) and the other perpendicular face (802) is used to bolt the fourth ATCM (800) to side-rails of the vehicle chassis (FIG. 1, 100).

FIG. 9 illustrates differences in terms of the torsional stiffness, bending stiffness and the lateral stiffness of the first ATCM (200), second ATCM (600), third ATCM (700) and the fourth ATCM (800). Further, as seen in FIG. 9, all the four ATCMs i.e., first ATCM (200), second ATCM (600), third ATCM (700) and the fourth ATCM (800) improve stiffness of the vehicle frame with respect to a baseline stiffness. In an embodiment of the present invention, selection of the ATCM for different vehicles depends upon requirements of the vehicle chassis (FIG. 1, 100) of the vehicle. In an embodiment of the present invention, the first ATCM (200) increases the torsional stiffness to four times of a baseline stiffness, maintains bending stiffness to the baseline stiffness and increases the lateral stiffness to 1.12 times of the baseline stiffness. In another embodiment of the present invention, the second ATCM (600) increases the torsional stiffness to four times of the baseline stiffness, maintains bending stiffness to the baseline stiffness and increases the lateral stiffness to 1.6 times of the baseline stiffness. In yet another embodiment of the present invention, the third ATCM (700) increases the torsional stiffness to eight times of the baseline stiffness, maintains bending stiffness to the baseline stiffness and increases the lateral stiffness to 1.2 times of the baseline stiffness. In another embodiment of the present invention, the fourth ATCM (800) increases the torsional stiffness to 1.6 times of the baseline stiffness, maintains bending stiffness to the baseline stiffness and maintains the lateral stiffness to the baseline stiffness.

In an exemplary embodiment of the present invention, Table 1 below illustrates application of the first ATCM (102), second ATCM (600), third ATCM (700) and fourth ATCM (800) along with class of vehicles where the ATCMs (102, 600, 700, 800) may be deployed for improved performance as described above.

TABLE 1

| ATCM | Class of Vehicle | Application |
|---|---|---|
| First ATCM (102) | Class 6, Class 7, Class 8 | Cargo |
| Second ATCM (600) | Class 6, Class 7, Class 8 | Cargo |
| Third ATCM (700) | Class 8 | Tipper, Refuse, Vocational |
| Fourth ATCM (800) | Class 5 and below | Cargo, Tipper etc. |

Advantageously, in accordance with various embodiment of the present invention, the present invention provides for an ATCM (102, 600, 700, 800) that has capability of mounting auxiliary components such as brake valves, brackets etc. The ATCM (102, 600, 700, 800) is attached to side rails (104) of the vehicle chassis (FIG. 1, 100) as a cross member and replaces conventional air tanks with reduced number of fasteners required in the vehicle chassis (FIG. 1, 100) as illustrated in FIG. 11. The ATCM also reduces the number of parts required inside the vehicle chassis (FIG. 1, 100), therefore reducing time required to assemble the vehicle chassis (FIG. 1, 100), and yet rigidity of the vehicle chassis (FIG. 1, 100) is increased.

Also, overall weight of the vehicle chassis (FIG. 1, 100) is reduced by deploying the ATCM (102, 600, 700, 800) since air tank and cross member is consolidated into a single part inside the vehicle chassis (FIG. 1, 100). The ATCM (102, 600, 700, 800) saves space on the chassis (FIG. 1, 100) and reduces number of air tanks and brackets required for air tanks. In the case of a trailer, conventionally, compressed air for brakes/suspension is generated by an air compressor on the truck (generally connected to engine of the truck) which is then stored in the air tanks on the trailer. The ATCM (102, 600, 700, 800) may be combined with a mounted compressor and deployed on trailers enabling independent air system for the trailer (as illustrated in FIG. 10). Further, the deployment of the ATCM (102, 600, 700, 800) also leads to reduction in number of pneumatic lines, typically, required in the trailer.

While the exemplary embodiments of the present invention are described and illustrated herein, it will be appreciated that they are merely illustrative. It will be understood by those skilled in the art that various modifications in form and detail may be made therein without departing from or offending the scope of the invention.

We claim:

1. An improved air tank cross member (ATCM) deployable in a vehicle chassis, the ATCM comprising:
   one or more structural elements comprising:
   a tube forming an enclosure for holding a compressed fluid and having mounting extensions on an outer surface of the tube for mounting auxiliary components;
   two or more brackets connected to the mounting extensions of the tube, wherein the brackets are designed with one perpendicular face mounted on a bottom face of the tube with respect to another perpendicular face to bolt the ATCM to side-rails of the vehicle chassis;
   a pair of end caps disposed at opposite ends of the tube for forming the enclosure, wherein the brackets are attached to the end caps by a fastening means to form a unified mounting geometry, and wherein the arrangement and construction of the structural elements of the ATCM provides for space-saving and weight-saving and increases stiffness value of one or more stiffness parameters of the vehicle chassis.

2. The ATCM as claimed in claim 1, wherein the structural elements comprise a plurality of ports connected at the outer periphery of the tube for allowing input and exit of the compressed fluid from the tube.

3. The ATCM—as claimed in claim 1, wherein the ATCM is deployable as a connecting member between side rails (104) of the vehicle chassis.

4. The ATCM as claimed in claim 1, wherein the tube is designed to minimize weight of the vehicle chassis on which the ATCM is mounted, and wherein the tube is hollow, circular, elliptical, square or rectangular in shape.

5. The ATCM—as claimed in claim 1, wherein the mounting extensions are in the form of solid extensions.

6. The ATCM as claimed in claim 1, wherein the mounting extensions are in the form of hollow extensions.

7. The ATCM as claimed in claim 1, wherein the tube is an extruded section that includes the mounting extensions.

8. The ATCM as claimed in claim 1, wherein the pair of end caps create an enclosed space in the tube for storing the compressed fluid within the ATCM.

9. The ATCM as claimed in claim 1, wherein the pair of end caps are a flat shaped closing structure, a hemispherical shaped closing structure, a tori spherical shaped closing structure or an ellipsoidal shaped closing structure for covering ends of the tube of the ATCM.

10. The ATCM as claimed in claim 5, wherein the structural elements include a mounting joinery comprising the brackets disposed on the outer surface of the tube, the mounting joinery comprising a helicoil insert in a threaded hole of the solid extensions on the outer surface of the tube, and wherein the helicoil insert attaches the tube to the bracket via a bolt.

11. The ATCM as claimed in claim 1, wherein the brackets are arranged such that one perpendicular face of the bracket is mounted on a top or a bottom face of the tube and a perpendicular face of the tube is used to bolt the ATCM to side rails of the vehicle chassis.

12. The ATCM as claimed in claim 10, wherein the mounting joinery is made of steel or aluminum based on a determination of requirement of strength for improved performance of the vehicle chassis.

13. The ATCM as claimed in claim 1, wherein the tube is welded to the pair of end caps and a plurality of ports is welded to the outer periphery of the tube to allow input and exit of the fluid from the tube.

14. The ATCM as claimed in claim 1, wherein the tube is an extruded section including two flat faces that are perpendicular to each other on the outer periphery of the tube such that the two flat faces are diametrically opposite to each other.

15. The ATCM as claimed in claim 14, wherein the two flat faces are designed with area necessary to mount the brackets as well as the auxiliary components.

16. The ATCM as claimed in claim 1, wherein the ATCM increases a torsional stiffness to four times of a baseline stiffness, maintains a bending stiffness to the baseline stiffness and increases a lateral stiffness to 1.12 times of the baseline stiffness.

17. The ATCM as claimed in claim 1, wherein the ATCM increases a torsional stiffness to four times of a baseline stiffness, maintains bending stiffness to a baseline stiffness and increases a lateral stiffness to 1.6 times of the baseline stiffness.

18. The ATCM as claimed in claim 1, wherein the ATCM increases a torsional stiffness to 1.6 times of a baseline stiffness, maintains bending stiffness to the baseline stiffness and maintains the lateral stiffness to the baseline stiffness.

19. An improved air tank cross member (ATCM) deployable in a vehicle chassis, the ATCM comprising:
one or more structural elements comprising:
a tube forming an enclosure for holding a compressed fluid and having mounting extensions on an outer surface of the tube for mounting auxiliary components, wherein the tube forms a direct connection of the ATCM to the vehicle chassis; and
two or more integrated brackets connected to the mounting extensions of the tube, wherein the integrated brackets include brackets and a plurality of ports to cover two open ends of the tube, and wherein the arrangement and construction of the structural elements of the ATCM provides for space-saving and weight-saving and increases stiffness value of one or more stiffness parameters of the vehicle chassis.

20. The ATCM as claimed in claim 19, wherein the ATCM is deployable as a connecting member between side rails of the vehicle chassis.

21. The ATCM as claimed in claim 19, wherein the plurality of ports is connected at the outer periphery of the tube for allowing input and exit of the compressed fluid from the tube.

22. The ATCM as claimed in claim 19, wherein the mounting extensions are in the form of open extensions.

23. The ATCM as claimed in claim 22, wherein the structural elements include a mounting joinery comprising the integrated brackets, the mounting joinery comprising a nut insert in the open extensions on the outer surface of the tube, wherein the nut insert attaches the tube to the integrated brackets via a bolt.

24. The ATCM as claimed in claim 22, wherein the tube is an extruded section and the auxiliary components are mounted onto a horizontal face or a vertical face of the tube via the open extensions disposed on the outer surface of the tube.

25. The ATCM as claimed in claim 23, wherein the mounting joinery is made of steel or aluminum based on a determination of requirement of strength for improved performance of the vehicle chassis.

26. The ATCM as claimed in claim 19, wherein the tube is welded to the integrated brackets.

27. The ATCM as claimed in claim 19, wherein the tube forms a direct connection between the ATCM and the vehicle chassis, thereby reducing number of parts required for assembling the ATCM on the vehicle chassis.

28. The ATCM as claimed in claim 19, wherein the ATCM increases a torsional stiffness to eight times of a baseline stiffness, maintains bending stiffness to the baseline stiffness and increases the lateral stiffness to 1.2 times of the baseline stiffness.

* * * * *